(12) United States Patent
Albert et al.

(10) Patent No.: US 7,992,589 B2
(45) Date of Patent: Aug. 9, 2011

(54) DUAL BUTTERFLY VALVE DRIVEN BY A COMMON DRIVE MOTOR

(75) Inventors: Laurent Albert, Vallangoujard (FR); Samuel Leroux, Poissy (FR); Guillaume Davoult, Saint Quen L'aumone (FR)

(73) Assignee: Valeo Systemes de Controle Moteur, Cergy Pontoise Cedex (FR)

( * ) Notice: Subject to any disclaimer, the term of this patent is extended or adjusted under 35 U.S.C. 154(b) by 484 days.

(21) Appl. No.: 12/296,669

(22) PCT Filed: Apr. 26, 2007

(86) PCT No.: PCT/FR2007/000718
§ 371 (c)(1),
(2), (4) Date: Oct. 10, 2008

(87) PCT Pub. No.: WO2007/125205
PCT Pub. Date: Nov. 8, 2007

(65) Prior Publication Data
US 2009/0050830 A1    Feb. 26, 2009

(30) Foreign Application Priority Data
Apr. 26, 2006   (FR) ...................................... 06 03711

(51) Int. Cl.
*F16K 11/18*    (2006.01)
(52) U.S. Cl. ................................... 137/637.1
(58) Field of Classification Search .................. 137/637, 137/637.1, 875
See application file for complete search history.

(56) References Cited

U.S. PATENT DOCUMENTS

| 2,383,861 | A | * | 8/1945 | Hopkins | 137/556.3 |
| 4,295,491 | A | * | 10/1981 | Galloway | 137/625.46 |
| 4,429,711 | A | * | 2/1984 | Schomer | 137/385 |
| 4,458,706 | A | * | 7/1984 | Scholes | 134/166 R |
| 4,749,004 | A | | 6/1988 | Peash | |
| 4,846,225 | A | * | 7/1989 | Scobie et al. | 137/862 |

(Continued)

FOREIGN PATENT DOCUMENTS

| EP | 0 388 505 A2 | 9/1990 |
| EP | 1 170 487 A2 | 1/2002 |
| EP | 1 515 023 A1 | 3/2005 |

OTHER PUBLICATIONS

International Search Report w/translation from PCT/FR2007/000718 dated Aug. 14, 2007 (6 pages).

*Primary Examiner* — John Fox
(74) *Attorney, Agent, or Firm* — Osha • Liang LLP

(57) ABSTRACT

A valve including a body delimiting an inlet duct opening into a first and second outlet duct. The body includes a first butterfly valve element and a second butterfly valve element. The first butterfly valve element is mounted on a first transmission gearwheel connected to a drive motor and is movable into two closed positions on either side of an open position of the first duct. The first transmission gearwheel is connected to a second transmission gearwheel, on which the second butterfly valve element is connected by a one-way positive drive element. When the first butterfly valve element is moved from an open position to one of the two closed positions in the first duct, the second butterfly valve element is driven from a closed position to an open position of the second duct. The valve includes a member for returning the second butterfly valve element to the closed position.

11 Claims, 6 Drawing Sheets

U.S. PATENT DOCUMENTS 5,704,398 A * 1/1998 Baker .......................... 137/862
6,216,737 B1 * 4/2001 Taylor et al. ................. 137/875
7,273,071 B2 * 9/2007 Marler et al. ................ 137/875
2005/0241702 A1 11/2005 Blomquist et al.

* cited by examiner

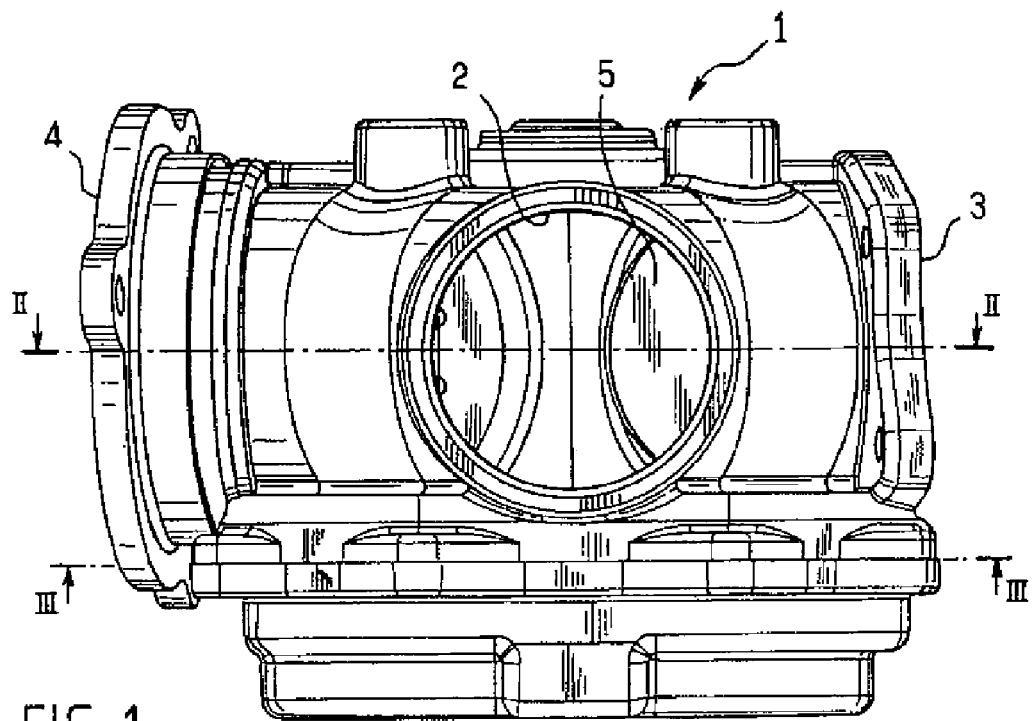
FIG_1
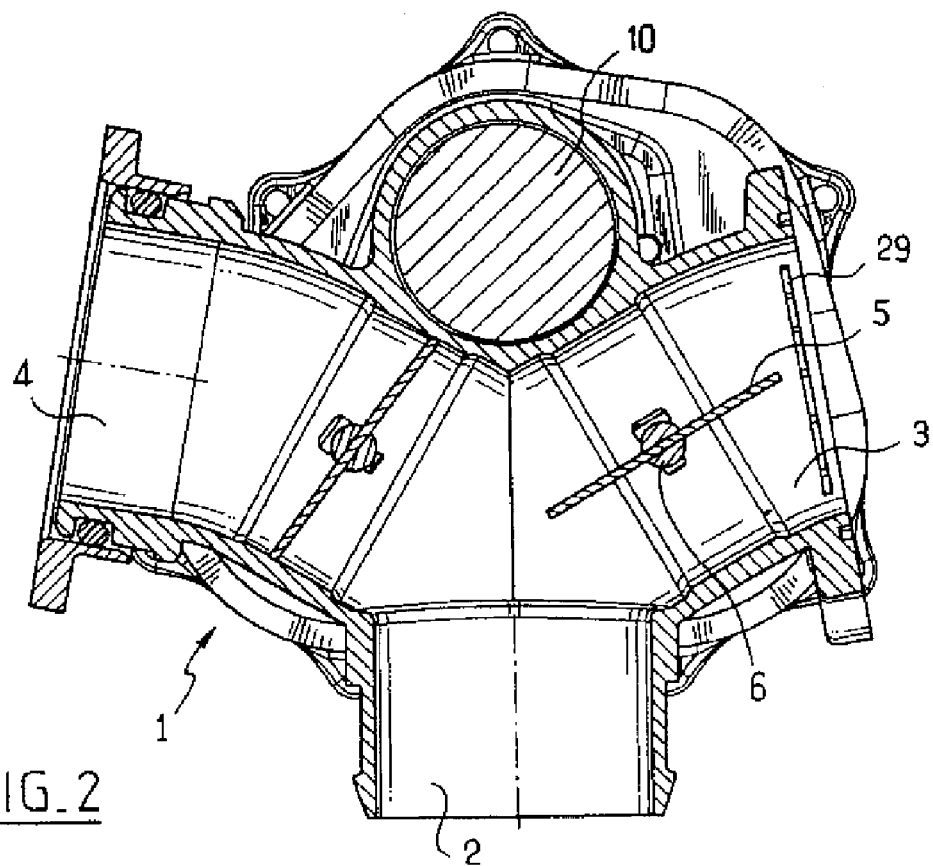
FIG_2

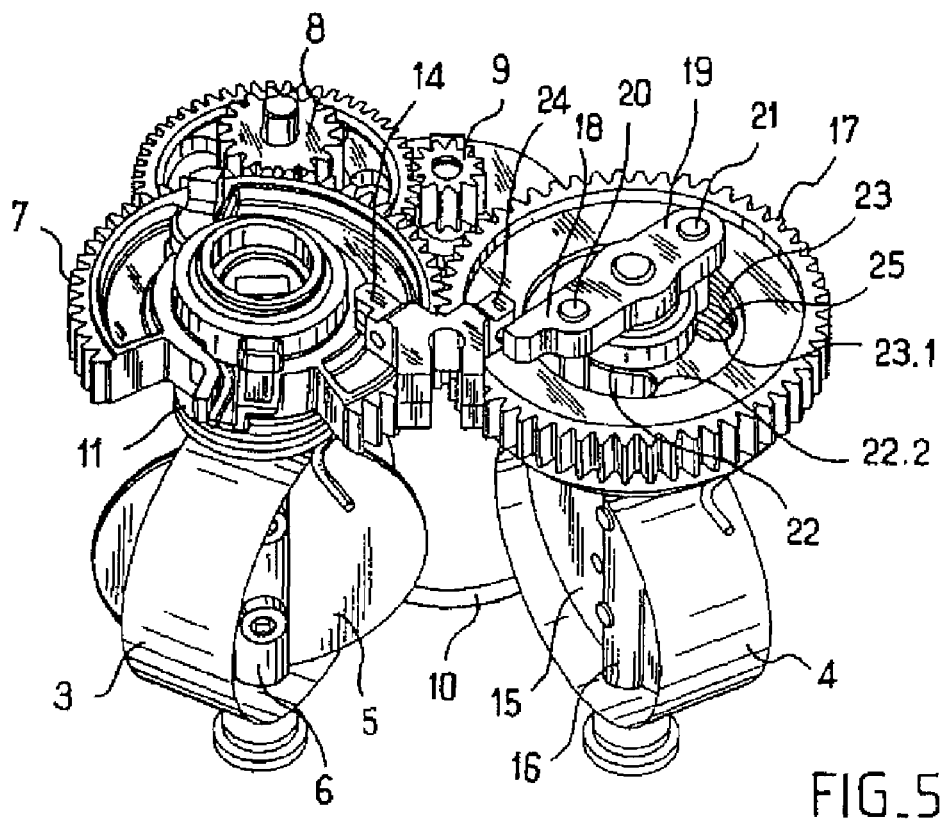
FIG_5
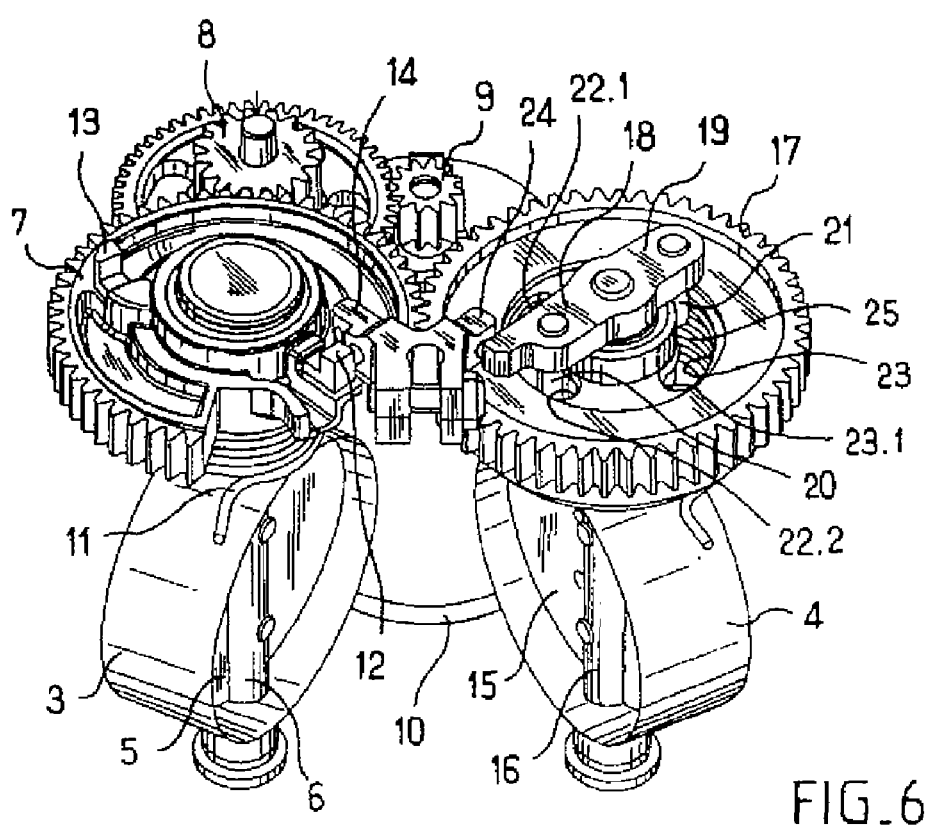
FIG_6

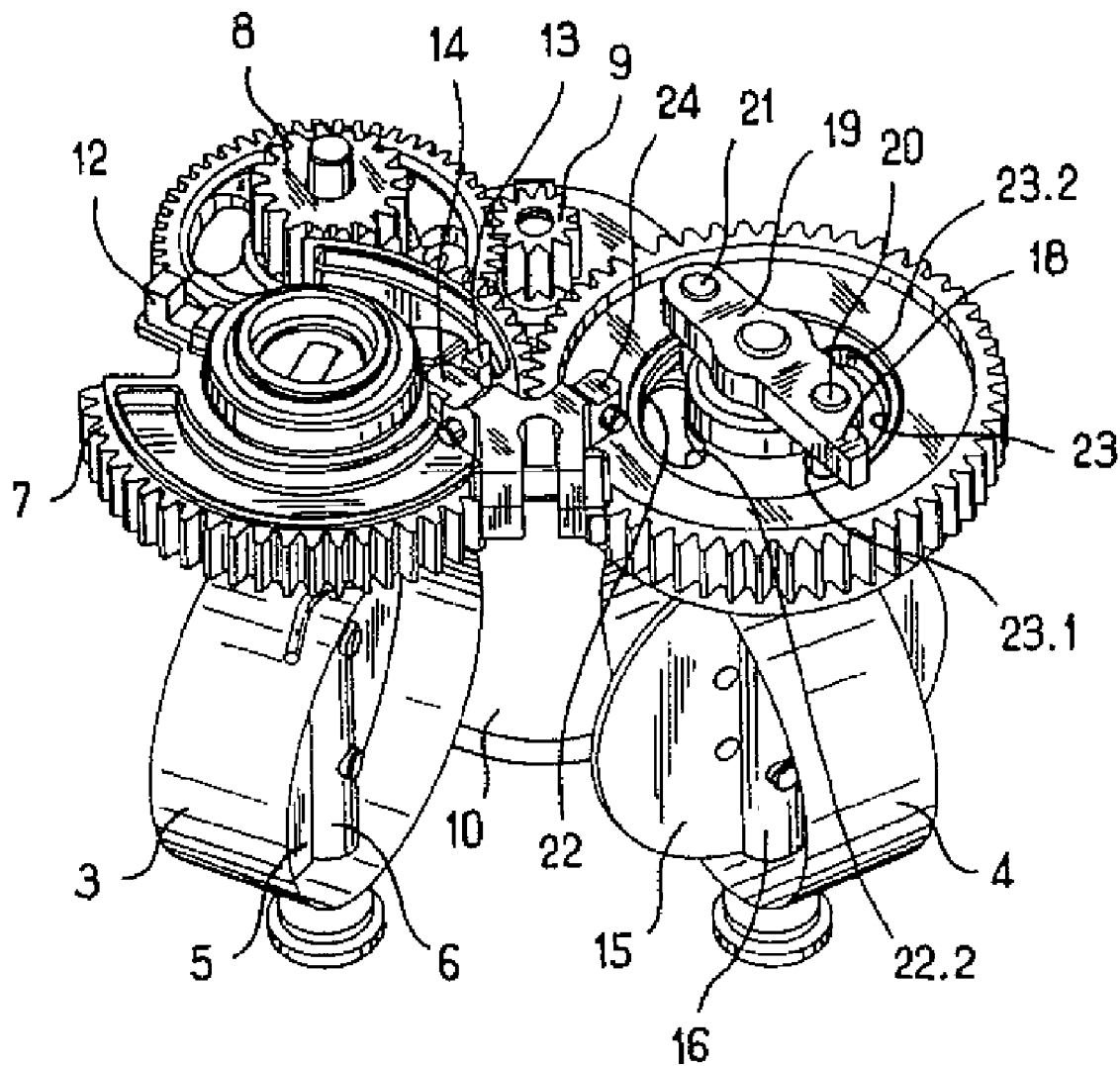
FIG_7

DUAL BUTTERFLY VALVE DRIVEN BY A COMMON DRIVE MOTOR

The present invention relates to a valve designed for example to be installed in a heat engine air intake system.

BACKGROUND OF THE INVENTION

Such an intake system comprises a cooled line and an uncooled line that are connected to the heat engine intake pipe by valves. The result of this is a considerable weight and space requirement of the engine making it awkward to install in the vehicle, a relative complexity of the engine making its maintenance difficult, and a relatively high number of parts increasing the risk of failure.

OBJECT OF THE INVENTION

In the context of the invention, the idea has been to replace these valves with a single valve comprising a body delimiting a first duct and a second duct that are respectively connected to the uncooled line and the cooled line and that open into a third duct connected to the intake pipe. The first duct and the second duct are provided with a first butterfly valve element and a second butterfly valve element each having an open position and a closed position. The first butterfly valve element must be able to be held in a position between the open position and the closed position in order to allow adjustment of the choking that it produces while the second butterfly valve element must be able to be moved either into its open position or into its closed position without an intermediate position being necessary. The valve therefore has a normal operating state in which the first butterfly valve element is placed in a position between its open position and its closed position while the second butterfly valve element is closed, a closed state in which the first butterfly valve element and the second butterfly valve element are in the closed position, and a cooling state in which the first butterfly valve element is in the closed position and the second butterfly valve element is in the open position. It would have been possible to envisage driving the butterfly valve elements by means of two coupled motors each associated with one of the butterfly valve elements. The use of two coupled motors would however make the valve complex, cumbersome and relatively costly.

One object of the invention is to provide a means of controlling the butterfly valve elements that is simple and economical.

SUMMARY OF THE INVENTION

For this purpose, according to the invention, a valve is provided comprising a body delimiting first and second ducts which open into a third duct and which are provided respectively with a first butterfly valve element and a second butterfly valve element. The first butterfly valve element is mounted on a first transmission gearwheel connected to an output shaft of a drive motor in order to be movable between a first closed position and a second closed position situated on either side of an open position of the first duct. The second butterfly valve element is mounted in order to pivot on a second transmission gearwheel connected to the drive motor, and is connected to the second transmission gearwheel by a one-way positive drive element when the first butterfly valve element is moved from its open position to its second closed position so as then to drive the second butterfly valve element from a closed position to an open position of the second duct, the valve comprising a member for returning the second butterfly valve element to its closed position when the first butterfly valve element is moved to its first closed position.

Therefore, the first butterfly valve element may be placed in a position between its open position and its first closed position without the second butterfly valve element leaving its closed position in which it is held by the return member. When the first butterfly valve element is moved to its second closed position, the one-way drive element causes the second butterfly valve element to move to its open position. The drive motor therefore drives the first transmission gearwheel and hence the first butterfly valve element, and the second transmission gearwheel, the second butterfly valve element being coupled to it in rotation by the drive element in one direction of rotation only.

Preferably, the drive motor is a direct current motor.

Such a motor has a torque that is greater than the torque developed by a torque motor.

According to a first embodiment, the second butterfly valve element is mounted on a spindle having one end protruding from the body and provided with a radial support in order to interact with a stop mounted on the second transmission gearwheel and, preferably, the radial support is fitted with a pin parallel to the spindle and received slidingly in a groove in the shape of an arc of a circle formed in the second transmission gearwheel and of which one end forms the drive stop. The drive member therefore has a simple structure.

Advantageously, the second transmission gearwheel is connected to the drive motor by the first transmission gearwheel.

The first transmission gearwheel forms a simple means of transmitting the movement of the output shaft of the drive motor to the second transmission gearwheel.

According to a second embodiment, the second butterfly valve element is mounted on a spindle having one end protruding from the body and provided with a support coupled in rotation to the spindle, and the second transmission gearwheel is mounted so as to rotate freely on this spindle end and is connected to the support by a torsion spring forming the return member and positioned to return the support to the closed position of the second butterfly valve element.

A single spring may therefore ensure the return of the two flaps to the closed position.

Other features and advantages of the invention will emerge on reading the following description of a particular, nonlimiting embodiment of the invention.

BRIEF DESCRIPTION OF THE DRAWINGS

Reference will be made to the appended drawings, in which:

FIG. 1 is a view in elevation of a valve according to a first embodiment of the invention, FIG. 2 is a view in section along the line II-II of FIG. 1, FIG. 5 is a partial view in perspective, the first butterfly valve element being in an intermediate position between its closed position and its open position and the second butterfly valve being in its closed position, FIGS. 6 and 7 are views similar to that of FIG. 5, the first butterfly valve element being in its second closed position and the second butterfly valve element being in the closed position and the open position respectively.

DETAILED DESCRIPTION OF THE INVENTION

Figure 3:
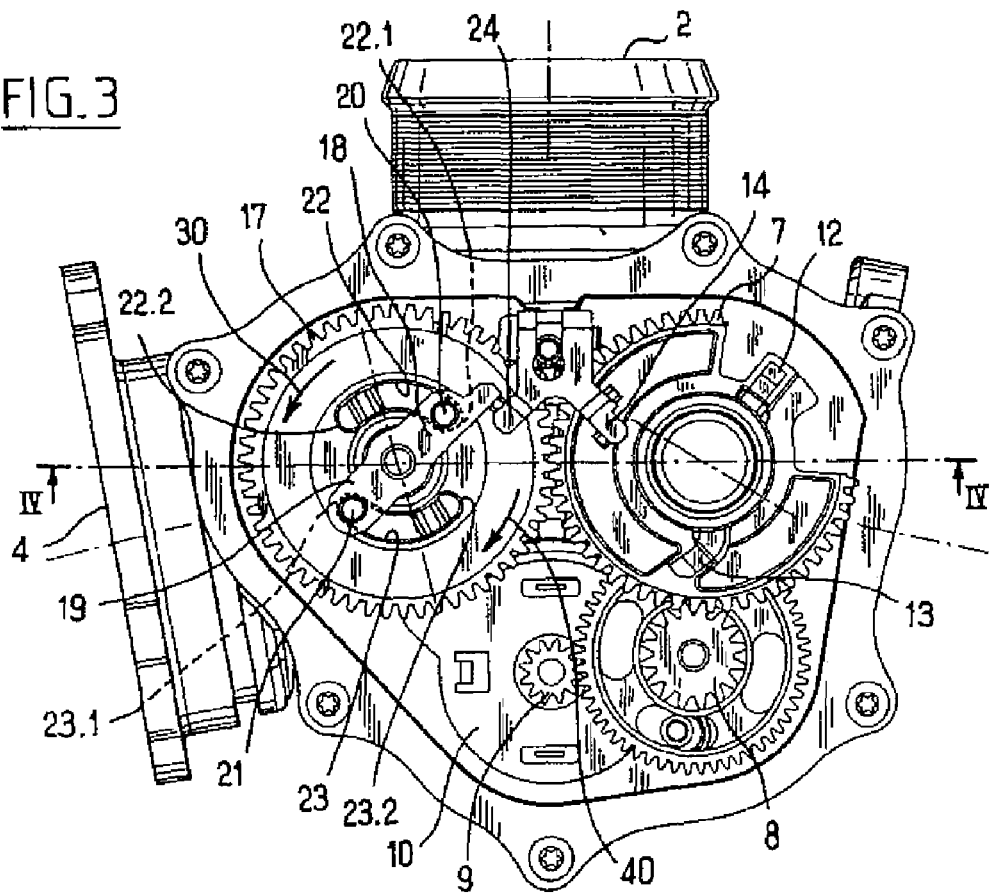
FIG. 3 is a view in section along the line III-III of FIG. 1, the first butterfly valve element being in its open position and the second butterfly valve element being in its closed position.
Figure 4:
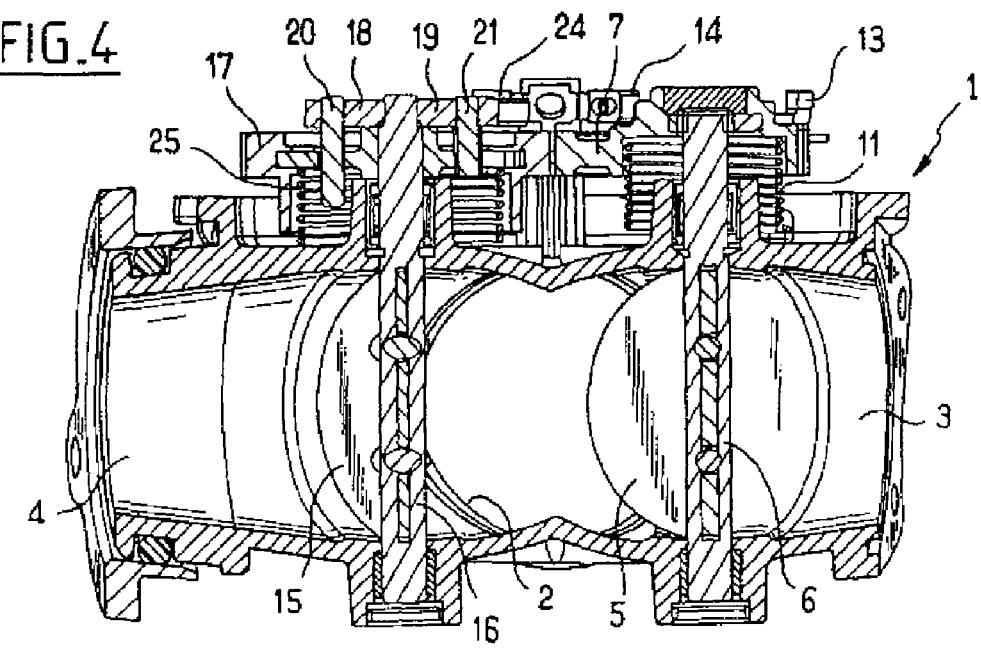
FIG. 4 is a view in section along the line IV-IV of FIG. 3.

With reference to FIGS. 1 to 7, the valve according to the invention comprises a body generally indicated as 1 delimiting a first duct 3 and a second duct 4 opening into a third duct 2. The body 1 and the ducts 3 and 4 are represented only partially in FIGS. 5 to 7.

The first duct 3 is fitted with a first butterfly valve element 5 mounted on a spindle 6, mounted so as to pivot on the body 1. The spindle 6 comprises one end protruding from the body 1 and coupled in rotation to a first transmission gearwheel 7, with teeth, engaged with an intermediate gear 8 itself engaged with a pinion 9 mounted on an output shaft of a motor 10 mounted on the body 1. The motor 10 is a direct current motor known per se connected to a source of electric power and to a control module that are also known per se and are not shown in the figures. A torsion spring 11 extends helically about said end of the spindle 6 having one end connected to the transmission gearwheel 7 and one end connected to the body 1. The spring 11 returns the butterfly valve element 5 to the open position (shown in FIGS. 2 to 4). The transmission gearwheel 7 is provided with lugs 12, 13 that are designed to interact with a stop 14 mounted on the body 1. When the lug 12 is in abutment against the stop 14, the butterfly valve element 5 is in a first closed position (shown in FIG. 6) and, when the lug 13 is pressing against the stop 14, the butterfly valve element 5 is in a second closed position (shown in FIG. 7). The butterfly valve element 5 is substantially perpendicular to the duct 3 when it is in its first closed position and in its second closed position, these positions being at approximately 180° from one another. Resistors, schematized as 29, extend in the duct 3 downstream of the butterfly valve element 5 and are attached to the body 1. The resistors 29 allow the fluid to pass and are in the form of aluminum fins or thin resistive strips whose thickness and shapes are arranged so as not to hamper or disrupt the flow of the fluid. The resistors 29 comprise means, known per se and not shown, for connection to an electric power supply source.

The second duct 4 is fitted with a second butterfly valve element 15 mounted on a spindle 16 that is mounted in order to pivot on the body 1 and that has one end protruding from the body 1 and on which a second transmission gearwheel 7 is mounted in order to pivot. A support is attached to this end of the spindle 16. The support defines two arms 18, 19 extending radially from the protruding end of the spindle 6, opposite to one another. Each arm 18, 19 is provided with a pin 20, 21 received in a groove 22, 23 in the shape of an arc of a circle formed in the transmission gearwheel 17. The arm 19 comprises a free end designed to butt against a stop 24 mounted on the body 1 and defining the closed position of the butterfly valve element 15 (represented in FIGS. 2 to 6). A torsion spring 25 extends helically about said end of the spindle 16 and has one end connected to the pin 21 and an opposite end connected to the body 1 in order to return the butterfly valve element 15 to the closed position. In the open position, the butterfly valve element 15 extends substantially along the axis of the duct 4.

The stops 14, 24 are attached to a support that can be positionally adjusted relative to the body 1.

Therefore the valve produced has:
  a normal or primary operating mode in which the butterfly valve element 15 is in the closed position and the position of the butterfly valve element 5 is adjustable between its open position and its first closed position (the intermediate position shown in FIG. 5),
  a stop mode in which the butterfly valve element 15 is in its closed position and the butterfly valve T0 element 5 is in its first closed position (FIG. 6),
  a secondary operating mode in which the butterfly valve element 15 is in its open position and the butterfly valve element 5 is in its second closed position (FIG. 7).

In normal operating mode, the motor 10 can move the butterfly valve element 5 into any position lying between its open position and its first closed position (see the intermediate position shown in FIG. 5). When the butterfly valve element 5 is in the open position (FIG. 3), the pins 20, 21 are received in one end 22.1, 23.1 of the grooves 22, 23. When the transmission gearwheel 7 pivots between the open position of the butterfly valve element 5 and its first closed position, the transmission gearwheel 7 drives the transmission gearwheel 17 (the direction of rotation 40 in FIG. 3), causing the pins to slide along the grooves 22, 23 in the direction of the other end 22.2, 23.2 of these grooves. The butterfly valve element 15 is therefore immobile, held in its closed position by the spring pressing the excrescence of the arm 18 against the stop 24.

When the butterfly valve element 5 is in its first closed position, the pins 20, 21 are received in the ends 22.2, 23.2 of the grooves 22, 23 and the butterfly valve element 15 is in its closed position so that the valve is in its stop mode (FIG. 6).

When the butterfly valve element 5 is returned to its open position from its first closed position, the transmission gearwheel 7 drives the transmission gearwheel 17 and the pins travel from the ends 22.2, 22.3 of the grooves 22, 23 to the ends 22.1, 23.1 without causing the butterfly valve element 15 to move.

When the transmission gearwheel 7 is moved to bring the butterfly valve element 5 into its second closed position, the transmission gearwheel 7 causes a rotation of the transmission gearwheel 17 in the direction referenced 30 in FIG. 3. Since the pins 19, 20 are in abutment against the ends 22.1, 23.1 of the grooves 22, 23, the pivoting of the transmission gearwheel 17 will cause a pivoting of the support and therefore of the spindle 16 and of the butterfly valve element 15. When the butterfly valve element 5 reaches its second closed position, the butterfly valve element 15 is in its open position. The valve is in its secondary operating mode (FIG. 7).

When the butterfly valve element 5 is returned from its second closed position to its open position (again by the action of the spring 11), the transmission gearwheel 17 is driven in the reverse direction (the direction referenced 40) by the transmission gearwheel 7 and the spring 25 exerts on the pin 21 a force to return the butterfly valve element 15 to its shutoff position.

The pins 20, 21 and the grooves 22, 23 therefore form a one-way (direction 30) drive for the butterfly valve element 15, this drive being positive (or active) when the butterfly valve element 5 is driven from its open position to its second closed position.

It will be noted that the spindles 6, 16 of the butterfly valve elements 5, 15 are installed in the vicinity of the third duct 2 and that:
  in the open position, the butterfly valve elements 5, 15 have a portion protruding into the duct 2, preferably up to the axis of the duct 2, in order to guide the gases and form deflectors;
  in the closed position, the butterfly valve elements 5, 15 are in the vicinity of the wall of the duct 2, and preferably substantially flush with the duct 2 and parallel to the wall of the latter, in order to limit the formation of gas recirculation zones and other disruptions of the flow in order to reduce the pressure losses.

Elements that are identical or similar to those of the first embodiment bear the same reference numbers in the description of the second embodiment with reference to FIGS. 8 to 11.

With reference to FIGS. 8 to 11, the valve according to the second embodiment is generally identical to that of the first embodiment except as concerns:
- the spring 11 which is absent from the second embodiment,
- the means for connecting the spindle 16 of the butterfly valve element 15 to the transmission gearwheel 17.

Figure 8:
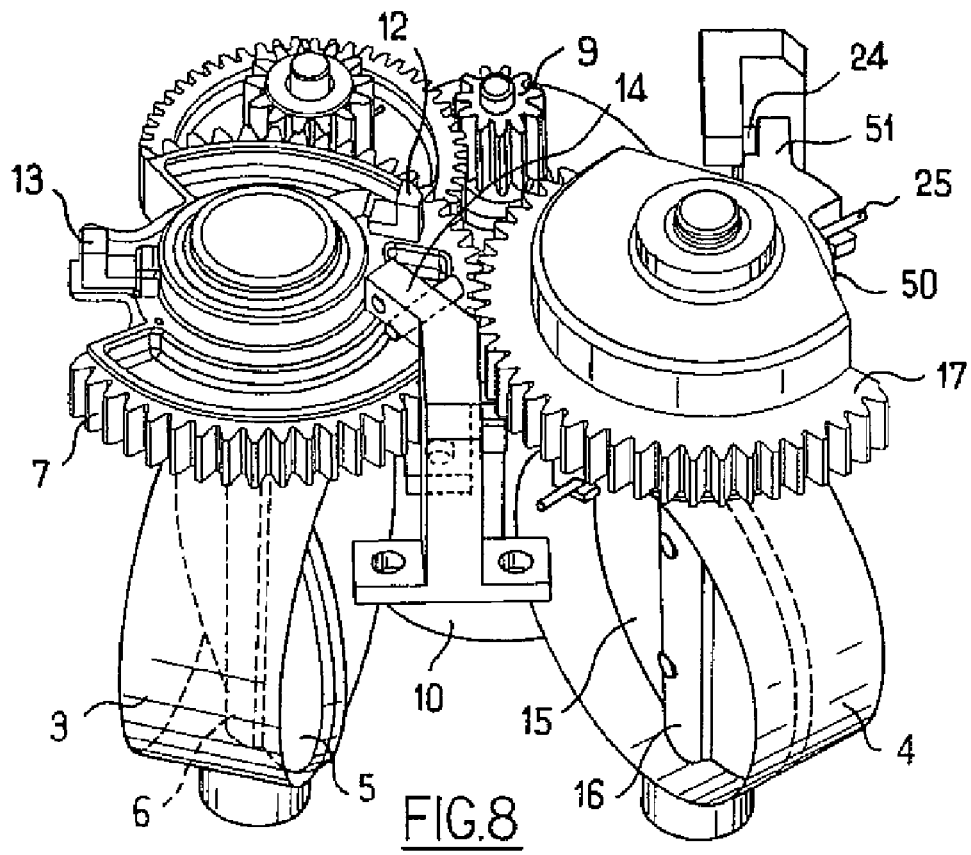
FIGS. 8 to 10 are views similar to FIGS. 5 to 7 of a valve according to a second embodiment.
Figure 9:
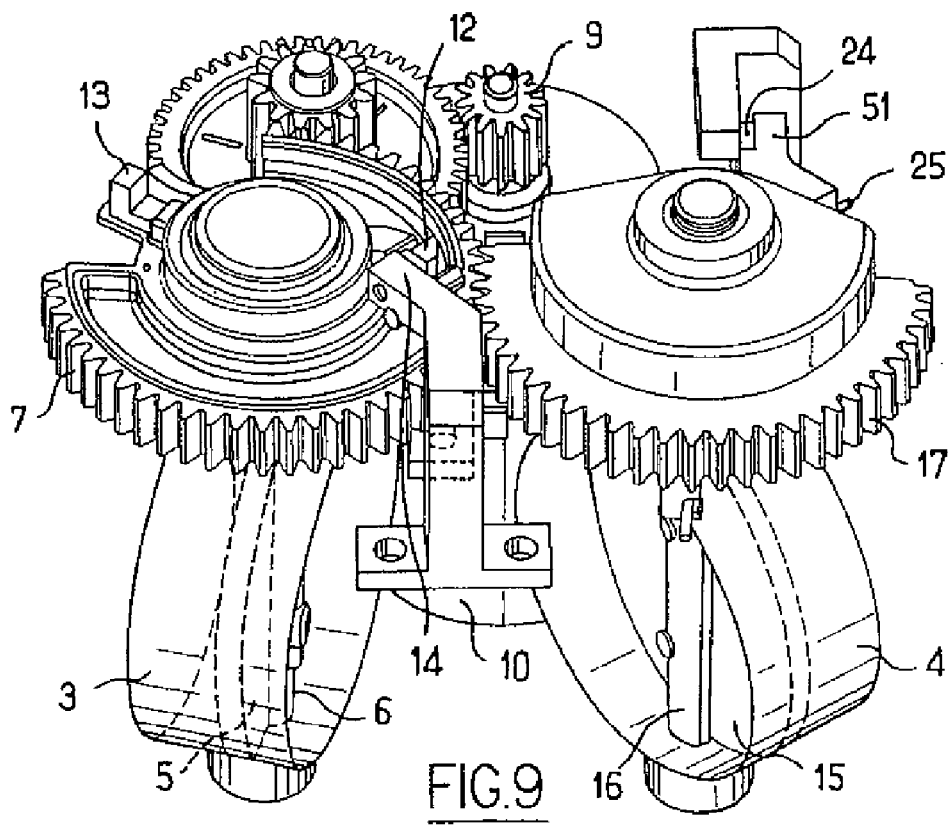

In this second embodiment, a support 50 is attached to the end of the spindle 16 on which the transmission gearwheel 17 is mounted in order to pivot. The support 50 comprises an arm 51 designed to butt against a stop 24 mounted on the body 1 and defining the closed position of the butterfly valve element 15 (FIGS. 8 and 9). The transmission gearwheel 17 comprises a portion resting against the arm 51.

The torsion spring 25 extends helically about said end of the spindle 16 and has one end connected to the support 50 and an opposite end connected to the transmission gearwheel 17 so as to press the arm 51 against the transmission gearwheel 17 and return the arm 51 to the stop 24.

Figure 10:
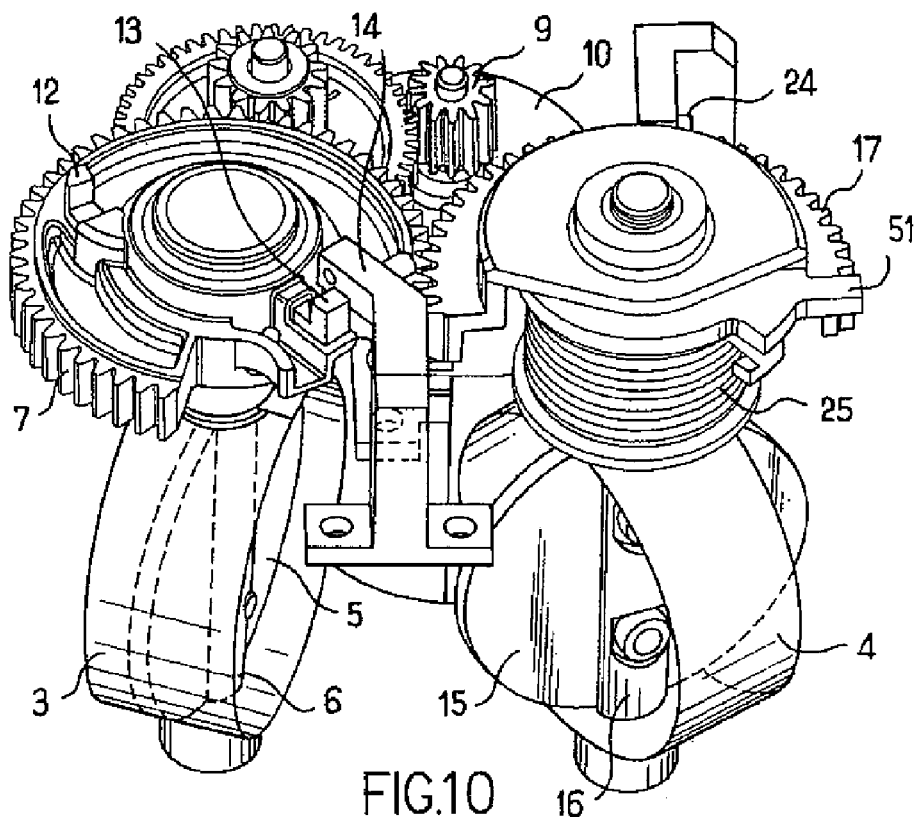
Figure 11:
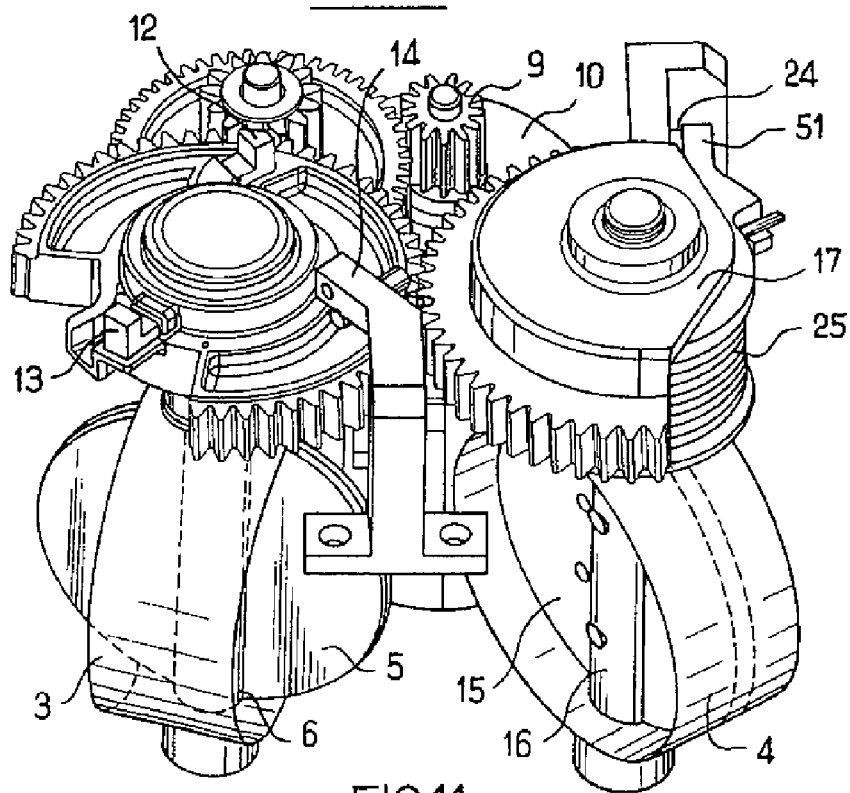
FIG. 11 is a view similar to FIG. 8, the first butterfly valve element being in the open position.

The transmission gearwheel 17 butts against the arm 51 of the support 56 when the transmission gearwheel 7 is moved to bring the butterfly valve element 5 in its open position to its second closed position and correspondingly drives the transmission gearwheel 17. The transmission gearwheel 17 then moves the flap 15 from its closed position to its open position by means of the support 50 (FIG. 10). When the transmission gearwheel 7 pivots in the contrary direction to return the butterfly valve element 5 to its open position, the transmission gearwheel 17 is brought to butt against the arm 51 and the torsion spring 25 moves the support 50 back against the stop 24 (FIG. 11).

In the open position of the butterfly valve element 5, the arm 51 is in abutment against the stop 24 and the transmission gearwheel 15 is in abutment against the arm 51.

When the transmission gearwheel 7 is moved to bring the butterfly valve element 5 from its open position to its first closed position (FIG. 8), the transmission gearwheel 17 is moved away from the arm 51 against the force exerted by the torsion spring 25. The support 50 remains in abutment against the stop 24 so that the butterfly valve element 16 remains in the closed position. The butterfly valve element 5 is in its first closed position when the lug 12 is resting against the abutment 14 (FIG. 9). When the transmission gearwheel 7 is moved in the contrary direction, the butterfly valve element 5 is brought to the open position (FIG. 11). It will be noted that, if the power supply of the motor 10 is disconnected, the torsion spring 25 will tend to press the arm 51 against the stop 24 and to cause the transmission gearwheel 17 to pivot in order to bring it to rest on the arm 51 so that the butterfly valve element 5 is in the open position and the butterfly valve element 16 is in the closed position (FIG. 11).

Naturally, the invention is not limited to the embodiment described and it is possible to make variants without departing from the context of the invention as defined by the claims.

In particular, the valve may have a structure that differs from that described, particularly with respect to the arrangement of the ducts, the geometry of the butterfly valve elements, the driving of the second transmission gearwheel, etc. The transmission gearwheels may be driven by means of belts. The motor may be engaged with the first transmission gearwheel and with the second transmission gearwheel, the first transmission gearwheel no longer then being used as a link between the motor and the second transmission gearwheel. The body may be made up of one or more parts.

The return member of the second butterfly valve element may be a mechanical or electric motor member.

The one-way drive member may have a structure other than that described and may comprise for example only one pin and one groove. One pin may also be mounted on the transmission gearwheel 17 in order to rest on the arm 19.

It goes without saying that the arrangement according to which at least one of the butterfly valve elements 5, 15 in the open position has a portion protruding into the third duct 2, and at least one of the butterfly valve elements 5, 15 in the closed position extends substantially in the vicinity of or even flush with the third duct 2, is applicable to any type of three-way valve having for example one inlet and two outlets, with two butterfly valve elements controlled by one or two motors.

Similarly, the resistors 29 can be used in any type of three-way valve having in particular one inlet and two outlets. The heating means may be provided in either of the ducts and may have a structure different from that described.

In addition, the return direction of the springs and the return position of the butterfly valve elements may be different from those described above.

The valve may have many applications particularly in the automotive field and more particularly, but not exclusively, in the intake system of a heat engine.

The invention claimed is:

1. A valve, comprising:
   a body delimiting first and second ducts which open into a third duct and wherein the first duct is provided with a first butterfly valve element and the second duct is provided with a second butterfly valve element,
   wherein the first butterfly valve element is mounted on a first transmission gearwheel connected to an output shaft of a drive motor in order to be movable between a first closed position and a second closed position, wherein the first closed position is situated on a first side of an open position of the first duct and the second closed position is situated on a second side of the open position of the first duct, and
   wherein the second butterfly valve element is mounted on a second transmission gearwheel connected to the drive motor and is configured to pivot,
   wherein the second butterfly valve element is connected to the second transmission gearwheel by a one-way positive drive element when the first butterfly valve element is moved from an open position to the second closed position, which drives the second butterfly valve element from a closed position of the second duct to an open position of the second duct, wherein the valve comprises a member for returning the second butterfly valve element to the closed position when the first butterfly valve element is moved to the first closed position.

2. The valve as claimed in claim 1, wherein the drive motor is a direct current motor.

3. The valve as clamed in claim 1, wherein the second butterfly valve element is mounted on a spindle having one end protruding from the body, wherein the spindle is provided with a radial support in order to interact with a stop mounted on the second transmission gearwheel.

4. The valve as claimed in claim 3, wherein the radial support is fitted with a pin parallel to the spindle and received slidingly into a groove, wherein the groove is in the shape of an arc of an circle formed in the second transmission gearwheel, wherein of which one end of the groove forms the drive stop.

5. The valve as claimed in claim 1, wherein the second transmission gearwheel is connected to the drive motor by the first transmission gearwheel.

6. The valve as claimed in claim 1, wherein the returning member is a torsion spring mounted between the second butterfly valve element and the body.

7. The valve as claimed in claim 1, wherein the second butterfly valve element is mounted on a spindle having one end protruding from the body and provided with a support coupled in rotation to the spindle, and wherein the second transmission gearwheel is mounted to rotate freely on an end of the spindle and is connected to the support by a torsion spring forming the returning member, wherein the second transmission gearwheel is positioned to return the support to the closed position of the second butterfly valve element.

8. The valve as claimed in claim 1, wherein at least one of the first and second butterfly valve elements in the open position has a portion protruding into the third duct.

9. The valve as claimed in claim 8, wherein said at least one of the first and second butterfly valve element has a pivoting spindle in the vicinity of the third duct.

10. The valve as claimed in claim 1, wherein at least one of the first and second butterfly valve elements in the closed position extends substantially flush with the third duct.

11. The valve as claimed in claim 1, wherein at least one of the first duct and second incorporate(s) heating means.

* * * * *